Oct. 10, 1950  R. M. JOHNSON  2,525,604
APPARATUS FOR RECOVERY OF CRAB MEAT
Filed Oct. 25, 1946  2 Sheets-Sheet 2
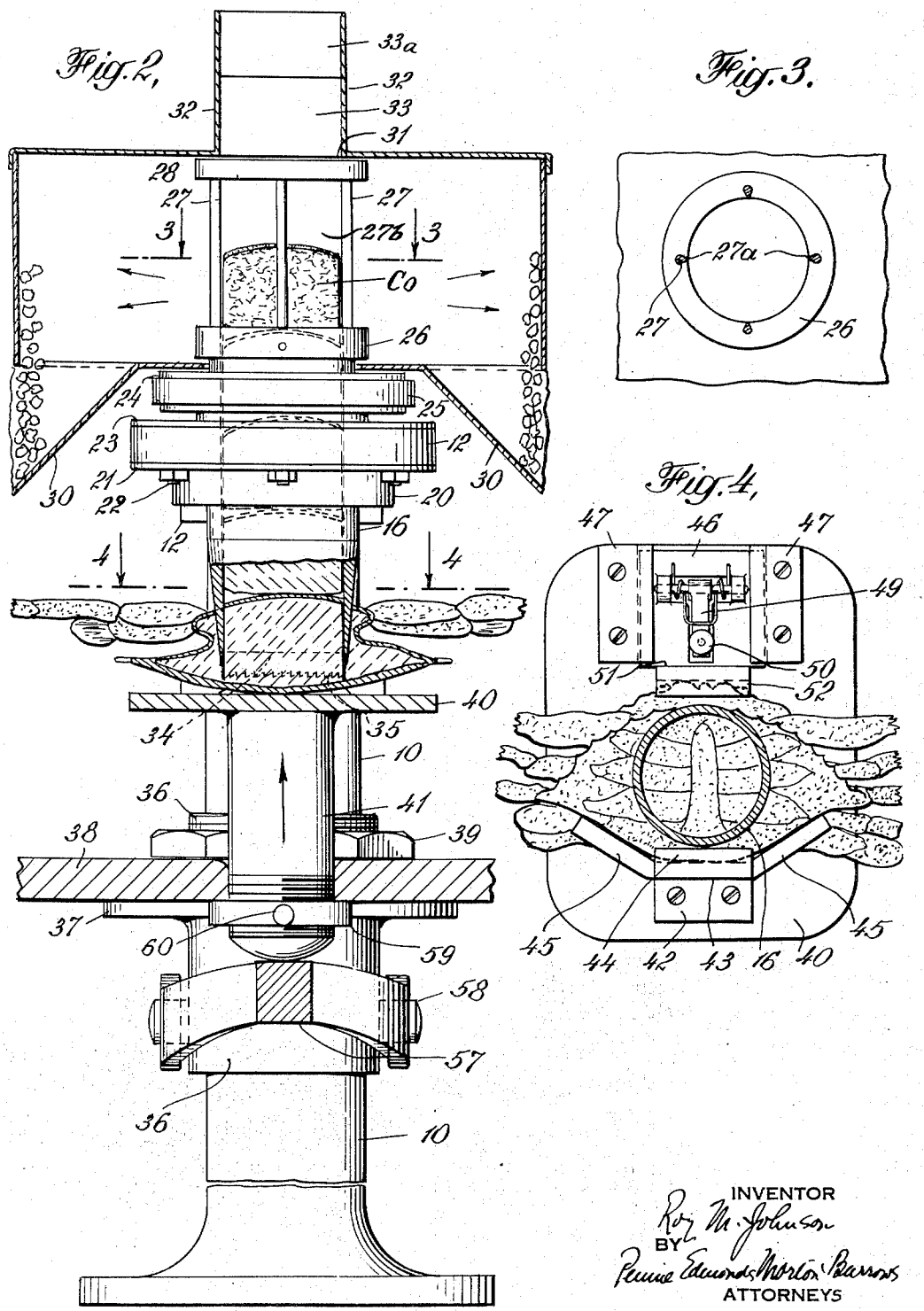
INVENTOR
Roy M. Johnson
BY
Pennie Edmonds Morton Barrows
ATTORNEYS Patented Oct. 10, 1950

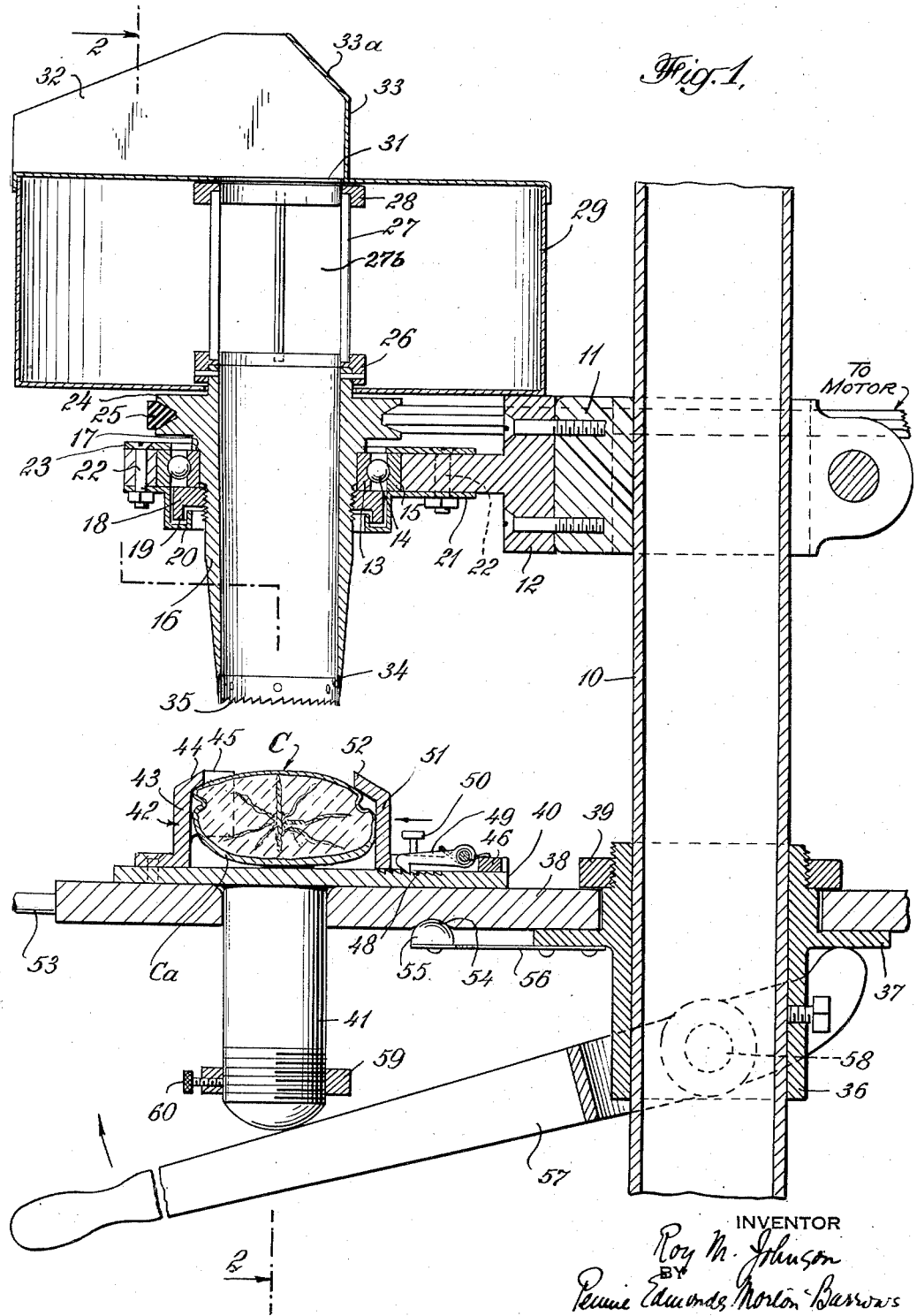

2,525,604

UNITED STATES PATENT OFFICE 2,525,604

APPARATUS FOR RECOVERY OF CRAB MEAT

Roy M. Johnson, Beaufort, S. C., assignor to The Blue Channel Corporation, Port Royal, S. C., a corporation of Maryland Application October 25, 1946, Serial No. 705,661

15 Claims. (Cl. 17—2)

This invention relates to the recovery of meat from crabs, such as the common edible crabs of the Atlantic Coast of the United States, and is concerned more particularly with a novel apparatus by which the meat contained within the shells of such crabs may be readily removed and recovered as a preliminary to canning. The new apparatus is suitable for the performance of the method disclosed in my co-pending application Serial No. 689,540, filed August 9, 1946, now Patent 2,522,578 granted September 19, 1950, and it is so constructed that all the steps of the method may be performed successively without interruption and without any manual operations other than the feeding of the crabs to the apparatus and the removal of the treated crabs therefrom.

The method of the prior application involves the steps of making a circular cut through the ventral surface of the body of the crab and through the meat and the skeletal parts within the body, the cut terminating at the inner surface of the carapace and defining a generally cylindrical core, which contains meat separated by the skeletal partitions within the body. After the cut is completed, the core is rotated upon its axis at high speed to free it from the carapace, and it is then removed from its original position within the body and again rotated upon its axis. During the second rotation, the meat is thrown by centrifugal force from the compartments defined by the skeletal partitions.

The new apparatus includes a holder in which crabs may be successively placed, with their ventral surfaces exposed. A tubular element is mounted in alignment with the holder and the element has an annular cutter at the end adjacent the holder and openings through its wall at a distance from the cutter. The portion of the tubular element provided with the openings is enclosed within means for collecting meat released by centrifugal action and such means may take the form of a chamber having an opening through one end wall in alignment with the open end of the tubular element beyond the openings in the wall thereof. In the operation of the apparatus, the crab is placed in the holder and, while the tubular element is rotated at high speed, the holder and element are given a relative movement, which causes the cutting means on the element to make a circular cut into the body of the crab to define a core. When the cut has extended about to the inner surface of the carapace, the core rotates with the element and, when the holder and element are separated, the core remains within the element. The treated crab is then removed from the holder, a fresh crab is placed in position, and the operations are repeated. The cores cut successively from the bodies of crabs and entering the tubular element force the first core through the element into registry with the openings in the tubular element. When this occurs, the meat contained in the core is thrown out by centrifugal action through the openings into the chamber. Upon the completion of further cutting operations, the core is advanced out of the tubular element and through the wall of the chamber, where it can be disposed of.

For a better understanding of the invention, reference may be had to the accompanying drawings, in which Fig. 1 is a view in vertical section through one form of the new apparatus;

Fig. 2 is a sectional view on the line 2—2 of Fig. 1; and

Figs. 3 and 4 are sectional views on the lines 3—3 and 4—4, respectively, of Fig. 2.

The apparatus illustrated in Fig. 1 comprises a column 10 extending upwardly from a suitable base and preferably of cylindrical form. A clamp 11 encircles the column at a distance above the base and has attached to it a bracket 12 having an opening, in which is seated a ball bearing comprising an inner ring 13, a row of balls 14, and an outer ring 15. The main body of a tubular element 16 extends through the inner ring 13 of the ball bearing and the ring is held against a circumferential shoulder 17 on the body by an annular nut 18 threaded on the outer surface of the body. The nut 18 has a circumferential flange 19, which extends into a channel 20 of a plate 21, which has an opening through which the tubular element extends and is secured by a bolt 22 against the under surface of bracket 12. Plate 21 holds the outer ring 15 of the ball bearing in place from beneath and a plate 23 secured to the upper surface of the bracket by bolt 22 overlies the ring 15 to hold it in place from above.

The body of the tubular element is formed with a circumferential flange 24 above the ball bearing and the flange has a channel in its face and serves as a pulley. A belt 25 is trained about the pulley and extends on either side of the column to the drive pulley of a motor (not shown).

Above the pulley 24, the tubular element includes a ring 26, which is secured to the top of the main body and is connected by a plurality of bars 27 to an upper ring 28. In the construction illustrated, there are four bars 27 and they are formed with sharp inner edges 27a. Rings 26 and 28 and the bars 27 connecting them lie within a chamber 29, which is secured in any convenient manner to the bracket 12. The chamber has one or more openings through its lower wall outwardly beyond the pulley and bearing, and inclined plates 30 lead downwardly and outwardly from the inner edges of the openings to form chutes. The chamber 29 has an opening 31 through its top wall leading into a channel between parallel vertical walls 32 on top of the chamber. A vertical wall 33 extending upwardly from one edge of the opening 31 connects walls 32 at one end thereof. Wall 33 has an inclined portion 33a partly overlying the opening 31 and directed lengthwise of the channel.

The outer surface of the lower end of the main body of the tubular element 16 is cut away to cause the thickness of the wall of the body to taper and, at the lower end of the body, an annular cutter 34 is detachably secured in place in a seat formed in the inner surface of the body. The cutter is provided with cutting teeth 35 at its exposed lower end.

A clamp 36 is mounted on column 10 below clamp 11 and it is provided with a circumferential flange 37, on which rests a circular plate 38 encircling the clamp and column. The plate 38 is held in place by an annular nut 39 threaded on clamp 36 above the plate and the plate is thus free to rotate. The plate is provided with a plurality of tables 40 disposed angularly about plate 38, each table having a stud 41 which extends downwardly through an opening in plate 38.

Each table 40 carries a holder for a crab on its upper face and the holder includes a standard 42 fixed in position and having a central vertical wall 43 provided with an overhanging top 44, and two angularly placed side walls 45. The faces of the walls 43 and 45 are so placed as to conform to the shape of one end of a crab, which is held flat on the table in contact with the walls by a clamping member 46 movable to and from the walls in guide members 47 secured to the top of the table. The clamping member 46 has a lengthwise opening, through which a row of ratchet teeth 48 formed on the top of the table are exposed, and the member carries a spring pressed detent 49 having a hooked end, which can be engaged with the teeth on the table to hold the member 46 in proper clamping position. The detent is provided with a handle 50, by which it may be freed from the teeth when the crab is to be released from the holding means. At its inner end, the clamping member 46 includes a vertical wall 51 with an overhanging top 52 and, when a crab has been laid on the top of the table with one end against walls 43 and 45, the clamping member 46 may be moved inwardly to engage the adjacent edge of the crab and hold the crab in proper position to be operated upon.

The plate 38 is preferably provided with one or more radial handles 53, by which the plate may be rotated to bring a table, on which a crab has been placed, into position with the crab directly beneath the tubular element. In order that the plate may be held in such position, it is formed on its lower surface with a plurality of depressions 54, in which may be seated a button 55 on the end of a leaf spring 56 attached to flange 37 of clamp 36.

In the operation of the machine, a crab held on top of a table 40 is raised against the cutter on the tubular element and, for this purpose, a lever 57 is provided. The lever has a bifurcated end, the legs of which lie on either side of clamp 36 and are pivoted thereto at 58. The lever extends outwardly beneath the stud 41 on a table 40, which is in proper position beneath the tubular element. Upon raising the outer end of the lever, it engages the stud 41 and raises the table to cause the cutter to act upon the crab held on the table. The cut to be made is to extend into the body of the crab C not quite to the inner surface of the carapace Ca, and the upward movement of the table 40 by lever 57 is, accordingly, limited by engagement of a ring 59 threaded on the lower end of stud 41 with the under surface of plate 38. The ring 59 is adjustable lengthwise of the stud and is held in any desired position of adjustment by a locking screw 60.

In the operation of the apparatus, the tubular element 16 is rotated at a high speed, such as 5,000 to 7,000 R. P. M., by the motor at all times. The attendant places a crab with its ventral surface uppermost on a table 40, which lies out from beneath the lower end of the tubular element, and clamps the crab firmly in position. He then swings the plate, until the table lies directly beneath the cutter and is held there by button 55 seating in one of the depressions in the under surface of the plate. The attendant now swings lever 57 upwardly to raise the table and move the crab into engagement with the cutter. As the upward movement of the table continues, the cutter, rotating at high speed, makes a clean annular cut through the ventral surface of the crab and through the meat and skeletal parts to define a cylindrical core Co. When the cut has extended to a point close to the inner surface of the carapace, the core is torn free from the body of the crab and rotates with the tubular element. Such rotation is permitted for a short period, since it has been found that, by rotating the core without removing it from the carcass of the crab, the material in the main visceral cavity beneath the carapace of the crab is churned up and assumes a watery consistency.

When the cutting operation has been completed, the attendant lowers the handle 57 and thereby, under the influence of gravity, the table 40 is lowered to the top of plate 38. As the crab is lowered with table 40, the core remains in the tubular element and, when a second crab is treated, the first core is forced upwardly through the tubular element by the second core. After a number of cutting operations, the first core passes through ring 26 and into engagement with the bars 27. The openings 27b defined by the bars are preferably at least as long as the length of a core and, when the core rises within the bars, the rotation of the tubular element at high speed causes the meat to be thrown from the core and out through the openings into the chamber 29. The meat leaves the chamber through the bottom openings and slides down plates 30 to suitable receptacles. As additional cores are cut and enter the tubular element, the top core is finally propelled through ring 28 and the opening 31 in the top wall of the chamber 29 into the space between walls 32. The cores thus discharged are substantially free of meat and they are removed from the space between walls 32 from time to time and disposed of.

The apparatus thus performs the several steps of the method of the co-pending application one after another, without interruption. As the cutting operation performed by the tubular element takes only a short time and the crab holders on the tables on the plate can be loaded and unloaded during cutting, the apparatus functions at a high output rate and performs the work heretofore requiring many manual pickers.

I claim:

1. In an apparatus for recovering meat from crabs, the combination of a tubular element having unobstructed open ends, cutting means at one end and openings through its side wall at a distance from said end, means for holding a crab with its ventral surface facing the cutting end of the element, means intermediate its ends for rotating the element, and means for effecting a relative movement of the element and holding means to cause the cutting means to sever a core from the body of the crab.

2. In an apparatus for recovering meat from crabs, the combination of a tubular element having unobstructed open ends, cutting means at one end and openings through its side wall at a distance from said end, means for holding a crab with its ventral surface facing the cutting end of the element, means intermediate its ends for rotating the element, means for effecting a relative movement of the element and holding means to cause the cutting means to sever a core from the body of the crab, and a chamber enclosing the portion of the tubular element containing said openings.

3. In an apparatus for recovering meat from crabs, the combination of a tubular element having unobstructed open ends, cutting means at one end and openings through its side wall at a distance from said end, means for holding a crab with its ventral surface facing the cutting end of the element, means intermediate its ends for rotating the element, and means for moving the holding means toward the cutting means to cause the latter to sever a core from the body of the crab.

4. In an apparatus for recovering meat from crabs, the combination of a tubular element having unobstructed open ends, cutting means at one end and openings through its side wall at a distance from said end, means for holding a crab with its ventral surface facing the cutting end of the element, means intermediate its ends for rotating the element, means for moving the holding means toward and away from the cuting means to cause the latter to sever a core from the body of the crab, the core remaining within the tubular element as the holding means are moved away from the cutting means, and a chamber enclosing the portion of the tubular element containing said openings.

5. In an apparatus for recovering meat from crabs, the combination of a tubular element mounted vertically for rotation on its axis, the element having unobstructed open ends and being provided with annular cutting means on its lower end and openings through its side wall above said end, means intermediate its ends for rotating the element, a holder for holding a crab with its ventral surface uppermost, the holder being mounted below the lower end of the element, and means for raising and lowering the holder, the upward movement of the holder causing the cutting means to sever a core from the body of a crab in the holder.

6. In an apparatus for recovering meat from crabs, the combination of a tubular element mounted vertically for rotation on its axis, the element having unobstructed open ends and being provided with annular cutting means on its lower end and openings through its side wall above said end, means intermediate its ends for rotating the element, a holder for holding a crab with its ventral surface uppermost, the holder being mounted below the lower end of the element, means for raising and lowering the holder, the upward movement of the holder causing the cutting means to sever a core from the body of a crab in the holder, and means for limiting the upward movement of the holder.

7. In an apparatus for recovering meat from crabs, the combination of a tubular element mounted vertically for rotation on its axis, the element being provided with annular cutting means on its lower end and openings through its wall above said end, means for rotating the element, a plate mounted for horizontal movement at a lower level than the cutting means, a holder on the plate for holding a crab with its ventral surface uppermost, and means for raising and lowering the holder relative to the tubular element, the upward movement of the holder, when in registry with the tubular element, causing the cutting means to sever a core from the body of the crab.

8. In an apparatus for recovering meat from crabs, the combination of a tubular element mounted vertically for rotation on its axis, the element being provided with annular cutting means on its lower end and openings through its wall above said end, means for rotating the element, a plate mounted for horizontal movement at a lower level than the cutting means, a plurality of holders on the plate, each operable to hold a crab with its ventral surface uppermost, the plate being movable to bring the holders selectively into alignment with the tubular element, and means for raising and lowering a holder aligned with the tubular element, the upward movement of the holder causing the cutting means to sever a core from the body of a crab in the holder.

9. In an apparatus for recovering meat from crabs, the combination of a tubular element mounted vertically for rotation on its axis, the element being provided with annular cutting means on its lower end and openings through its wall above said end, means for rotating the element, a plate mounted for horizontal movement at a lower level than the cutting means, a plurality of holders on the plate, each operable to hold a crab with its ventral surface uppermost, the plate being movable to bring the holders selectively into alignment with the tubular element, means for holding the plate against movement when a holder thereon is aligned with the tubular element, and means for raising and lowering a holder aligned with the tubular element, the upward movement of the holder causing the cutting means to sever a core from the body of a crab in the holder.

10. In an apparatus for recovering meat from crabs, the combination of a tubular element mounted vertically for rotation on its axis, the element having unobstructed open ends and being provided with annular cutting means on its lower end and openings through its side wall above said end, means intermediate its ends for rotating the element, a holder for holding a crab with its ventral surface uppermost, the holder being mounted below the lower end of the element, means for raising and lowering the holder, the upward movement of the holder causing the cutting means to sever a core from the body of a crab in the holder, and a chamber enclosing that part of the tubular element containing the openings.

11. In an apparatus for recovering meat from crabs, the combination of a holder for holding a crab with its ventral surface exposed, means for severing a cylindrical core from the crab in the holder, removing the core from the body of the crab, and rotating the core on its axis to discharge the meat therefrom, said means including a tubular element having an annular cutter at one end and openings through its wall at a distance from the cutter, said openings being at least as long as a core, and means for rotating the tubular element, means for collecting the meat discharged, and means for effecting relative movement of the holder and tubular element in a direction axially of the element.

12. In an apparatus for recovering meat from crabs, the combination of a holder for holding a crab with its ventral surface exposed, means for severing a cylindrical core from the crab in the holder, removing the core from the body of the crab, and rotating the core on its axis to discharge the meat therefrom, said means including a tubular element having an annular cutter at one end and openings through its wall at a distance from the cutter, said openings being at least as long as a core, and means for rotating the tubular element, a chamber for collecting the meat discharged and enclosing that part of the tubular element containing the openings, the chamber having an opening through one of its walls in registry with the end of the tubular element opposite that carrying the cutter.

13. In an apparatus for recovering meat from crabs, a tubular element having unobstructed open ends and a diameter less than that of the body of a crab and having an annular cutter at one end and a plurality of openings through its side wall at a distance from the cutter.

14. In an apparatus for recovering meat from crabs, a tubular element having unobstructed open ends and a diameter less than that of the body of a crab and having an annular cutter at one end and a plurality of spaced bars extending lengthwise of the element and forming a portion of its side wall at a distance from the cutter, the spaced bars defining in part openings through the side wall.

15. In apparatus for recovering meat from crabs, a tubular element having unobstructed open ends and an annular cutter at one end, the external diameter of said one end tapering inwardly toward the annular cutter, the element having a plurality of spaced bars extending lengthwise thereof and forming a portion of its side wall at a distance from the cutter, the spaced bars defining in part openings through the side wall.

ROY M. JOHNSON.

REFERENCES CITED

The following references are of record in the file of this patent:

UNITED STATES PATENTS

| Number | Name | Date |
| --- | --- | --- |
| 1,722,450 | Barry | July 30, 1929 |
| 2,335,806 | Sjostrom | Nov. 30, 1943 |